(12) United States Patent
Travis et al.

(10) Patent No.: US 6,202,960 B1
(45) Date of Patent: Mar. 20, 2001

(54) AIRCRAFT LANDING GEAR ABSORBER

(75) Inventors: Matt H. Travis, Fall City; Nathan D. Batts, Edmonds; Garrett H. DeVlieg, Bellevue, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/187,613

(22) Filed: Nov. 6, 1998

(51) Int. Cl.$^7$ ................................................. B64C 25/32
(52) U.S. Cl. ..................... 244/103 R; 188/380; 301/36.1
(58) Field of Search ........................... 244/100 R, 104 R, 244/104 CF, 104 CS, 111; 188/380; 73/123

(56) References Cited

U.S. PATENT DOCUMENTS

| | | | |
|---|---|---|---|
| 2,736,393 | * | 2/1956 | O'Connor ............................ 188/380 |
| 2,838,137 | * | 6/1958 | Wallerstein ......................... 188/380 |
| 3,133,717 | * | 5/1964 | Hartel ............................... 244/103 R |
| 4,326,755 |   | 4/1982 | Fretz, III . |
| 4,475,634 |   | 10/1984 | Flaim et al. . |
| 4,619,349 |   | 10/1986 | Braun . |
| 4,697,781 |   | 10/1987 | Hamano et al. . |
| 4,991,698 | * | 2/1991 | Hanson ............................... 188/380 |
| 5,099,961 |   | 3/1992 | Dreilich et al. . |
| 5,255,761 |   | 10/1993 | Zaremsky . |
| 5,310,025 |   | 5/1994 | Anderson ........................... 188/73.37 |
| 5,564,537 |   | 10/1996 | Shoureshi . |
| 5,573,088 |   | 11/1996 | Daniels . |
| 5,590,743 |   | 1/1997 | Houmard et al. . |
| 5,746,394 | * | 5/1998 | Gunnoe et al. ...................... 244/111 |
| 5,806,794 | * | 9/1998 | Hrusch et al. ....................... 244/111 |
| 5,816,373 | * | 10/1998 | Osterberg et al. ................. 188/380 |
| 5,945,598 | * | 8/1999 | Enright ................................. 73/123 |

* cited by examiner

*Primary Examiner*—Charles T. Jordan
*Assistant Examiner*—Francis T. Palo
(74) *Attorney, Agent, or Firm*—Christensen O'Connor Johnson Kindness PLLC

(57) ABSTRACT

A method and apparatus for eliminating aircraft landing gear fore-and-aft vibration is provided. The method includes using a tuned mass absorber attached to the landing gear. The gear walk motion has a peak amplitude motion and a pre-peak amplitude motion. The tuned mass absorber includes a mass and a spring, with the mass being oriented to move in a fore-and-aft direction at a frequency and amplitude that counterbalances the gear fore-and-aft vibration. The mass in one embodiment is of an amount in the range of 1 to 2 percent of the effective landing gear mass. In one embodiment, the tuned mass absorber is attached to a landing gear strut near the strut's distal end. The motion of the tuned mass absorber mass moves at a frequency and amplitude that counterbalances the gear walk pre-peak amplitude motion. Therefore, the absorber mass is of an amount less than the mass required to counterbalance gear walk peak amplitude motion. The tuned mass absorber thereby eliminates the gear walk motion in its formation.

11 Claims, 3 Drawing Sheets

AIRCRAFT LANDING GEAR ABSORBER

FIELD OF THE INVENTION

The present invention relates to aircraft landing gear, and more particularly, to systems for inhibiting vibration of aircraft landing gear during braking.

BACKGROUND OF THE INVENTION

Certain friction characteristics in aircraft landing gear brakes can lead to fore-and-aft oscillations of the landing gear called "gear walk." These friction characteristics are frequently associated with a particular type of brake lining. Historically, this brake lining friction characteristic has been called "negative damping," since it effectively feeds energy into the landing gear system. Negative damping is mathematically defined as an increase in brake friction that is proportional to a decrease in brake lining rubbing speed. As the aircraft slows to a stop, the brakes become grabby and torque increases without having received an increase in brake pedal pressure. This change in torque can cause divergent oscillations of the landing gear in the fore-and-aft direction, such as those shown in FIG. 1. The vibrations are initially small but become larger with each oscillation until some peak amplitude A is reached as shown in FIG. 1.

Gear walk is generally an undesirable characteristic, due to the loads that can be imposed by the oscillations of the landing gear components. In addition, the resultant aircraft motion during braking may be disconcerting to passengers and crew.

Currently, it is known that a tuned mass absorber can be employed to address a forced steady state vibration problem where attenuation of vibration of some object is desired. The classic application is to apply a tuned mass absorber to a second order mass spring damper-type assembly that is being excited by an external sinusoidal force. A tuned mass absorber is attached to the assembly and is sized and tuned using a steady state analytical solution to the problem. This results in the peak amplitude assembly motions being greatly attenuated. The classic tuned mass absorber application can be demonstrated in the following simplified example. Referring to FIG. 2, an object O with mass $M_1$ is moved relative to ground through a spring $S_1$ having a spring constant $K_1$. The object O is subjected to a force $F\sin(\omega t)$ which results in vibration of the object O. The force cannot simply be eliminated due to some unspecified reason. The goal is therefore to reduce the vibration of the object O by some other means.

One method of achieving this goal is to employ a tuned mass vibration absorber. This is represented in FIG. 2 as an absorber mass $M_2$ attached to a spring $S_2$ having a spring constant $K_2$. The spring $S_2$ is further attached to the object mass $M_1$. The mass $M_2$ is allowed to move. If mass $M_2$ and spring $S_2$ are properly tuned, then the motion of the mass $M_2$ will exert a force on mass $M_1$ that is equal and opposite to the force already acting on the object O. The result is a cancellation of forces, with the object O remaining at rest while the absorber mass $M_2$ moves in a sacrificial manner. The design of a tuned mass absorber requires knowledge of the frequency $\omega$ of the object's motion, the magnitude of the sinusoidal force F acting on the object, and either the maximum allowable size of the absorber mass $M_2$ or its maximum allowable range of motion $X_2$. The following equation describes the relationship between these variables.

$$F = -k_2 \times X_2 = -\omega^2 \times M_2 \times X_2 \tag{1}$$

Using data from a recent case of gear walk as an example, calculation of the equivalent force F required to move the landing gear at the peak vibration amplitudes observed was as high as 2330 pounds. The landing gear motion occurred at a natural frequency of 9.7 Hz. With a space constraint of 3.1 inches of allowable peak to peak motion, then equation (1) indicates that a mass $M_2$ of about 150 lbm is required to produce a counterbalancing motion for amplitude A.

It is clear that using the classical design methodology, a rather heavy tuned mass absorber is required to reduce the undesired landing gear motion. This is an impractical solution for aircraft due to the weight penalty, and the fact that landing gear retraction actuators would not be sized for this additional load. Thus, a need exists for eliminating gear walk in a manner that does not add large amounts of weight to the aircraft and that does not require large amounts of space. The present invention is directed to fulfilling this need.

SUMMARY OF THE INVENTION

In accordance with aspects of the present invention, an improvement to an aircraft landing gear system is provided. The landing gear system includes a braking assembly, an elongated strut, and a wheel and tire assembly attached to a strut distal end. During use, the landing gear system exhibits fore-and-aft gear walk motion about an axis of rotation located above the wheel in a lateral plane. The gear walk motion is divergent and is caused by self-excited brake forces. The divergent motion includes a peak amplitude motion and a pre-peak amplitude motion. The improvement includes a tuned mass absorber attached to the strut near its distal end. The tuned mass absorber is oriented to cause its mass to move in a fore-and-aft direction at a frequency and amplitude that counterbalances the gear walk pre-peak amplitude motion by using a mass of an amount less than the mass required to counterbalance the gear walk peak amplitude motion. The tuned mass absorber thereby eliminates the gear walk motion in its formation.

In accordance with other aspects of this invention, a method of eliminating aircraft landing gear fore-and-aft vibration is provided. The vibration includes a peak amplitude motion and a pre-peak amplitude motion. The method includes using a tuned mass absorber attached to the landing gear. The tuned mass absorber includes a mass of an amount addressed to the pre-peak amplitude motion.

In accordance with other aspects of this invention, the tuned mass absorber includes a housing canister having first and second interior regions and a middle interior region, a metal coil spring housed in the first interior region, and a mass housed in the middle interior region and engaged with the spring. In an alternative embodiment, the tuned mass absorber includes a housing canister, an elastomeric material, and a mass.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The inventors herein have discovered hitherto unknown characteristics of the gear walk phenomenon that have allowed the inventors to provide a unique method and apparatus for eliminating gear walk in aircraft landing gear systems. In more detail, the inventors herein have discovered that control of the conditions at the initiation of gear walk motion have a significant affect on the maximum amplitude of motions that develop later on. In the case of aircraft landing gear fore-and-aft motion caused by gear walk, there is no sinusoidal forcing function. Instead, the mechanism causing the unstable motion is self-exciting within the brakes and causes the gear to vibrate at its natural frequency. The vibrations caused by this self-exciting mechanism are initially small but become larger with each oscillation until some peak amplitude is reached.

Figure 1:
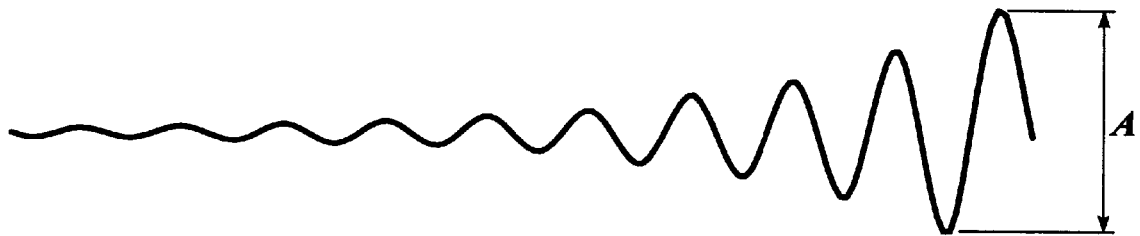
FIG. 1 is a plot of a vibratory motion characteristic of aircraft landing gear "gear walk;"
Figure 2:
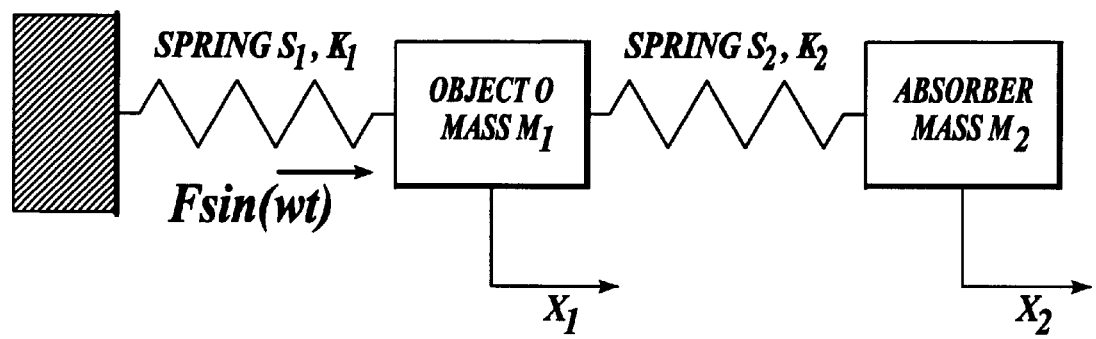
FIG. 2 is a simplified example illustrating the classical approach to applying a tuned mass absorber.
Figure 3:
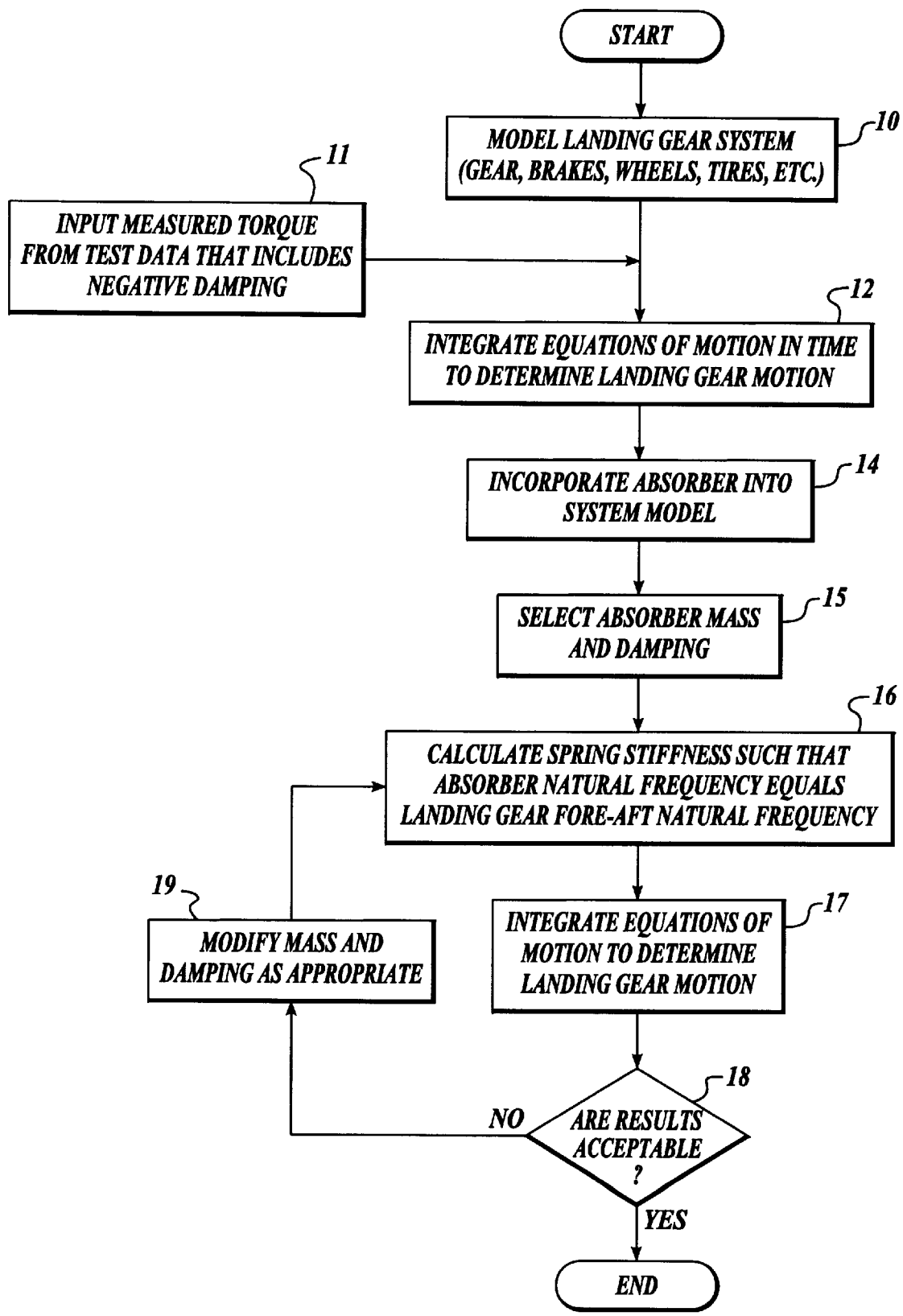
FIG. 3 is a flow diagram illustrating a method formed in accordance with the present invention.

Referring to FIG. 3, a method of designing a tuned mass absorber for eliminating aircraft gear walk includes first modeling the landing gear and brake system at block 10, accounting for the brakes, wheels, tires, etc. The modeling includes determining the non-steady state equations of motion for the system. At block 11, an accurate description of the torque produced by the brake—which includes measured negative damping—is input to the model. Transient time domain integration of these equations of motion is then conducted at item 12.

A tuned mass absorber is incorporated into the system at block 14 and the equations of motion are altered to include the effects of the absorber. Any constraints, such as mass and/or distance, are included in the model and the equations. At block 15, selection is made of the variable values to be used in solving the equations of motion. For aircraft landing gear, the most significant concerns are absorber mass $M_2$ (hence mass is selected in the embodiment of FIG. 3) and allowable mass travel distance $X_2$. Damping of the absorber mass/spring assembly must also be evaluated as a parameter. Too much or too little damping on the absorber is detrimental to the performance, therefore optimization of damping is also performed.

Still referring to FIG. 3, calculation is made at block 16 of the spring stiffness required such that the absorber has a natural frequency that is equal to the landing gear fore-and-aft natural frequency. The equations of motion are integrated in time to obtain resulting landing gear motion at block 17. If the resulting gear motion is acceptable at decision block 18, then the tuned mass absorber is configured accordingly. If the results are not acceptable, then the variables (e.g., mass and damping) are modified at block 19 and the resulting motion is recalculated at block 17.

It was discovered by the inventors herein that using the above method that a tuned mass absorber of significantly less weight than that predicted by classical equations can be effectively used to counterbalance the motion of the landing gear in its initial self-excited state. The tuned mass absorber of the present invention thus eliminates gear walk vibration before it can develop into a mature state. The present invention therefore is not concerned with sizing a tuned mass absorber to cancel the peak amplitude landing gear response, but instead concerned with sizing a tuned mass absorber according to the initial landing gear behavior so as to avoid the peak landing gear response.

In the example above, the classical solution indicates a mass of 150 lbm is necessary to counteract an event that reaches a force F of 2330 lbs. However, the present invention method results in a mass of 32.5 lbm, reducing the gear vibration level by about 90% (i.e., from 12 g down to 1.4 g of acceleration). The predicted motion of the absorber is also within the space constraint of 3.1 inches peak to peak.

Figure 4:
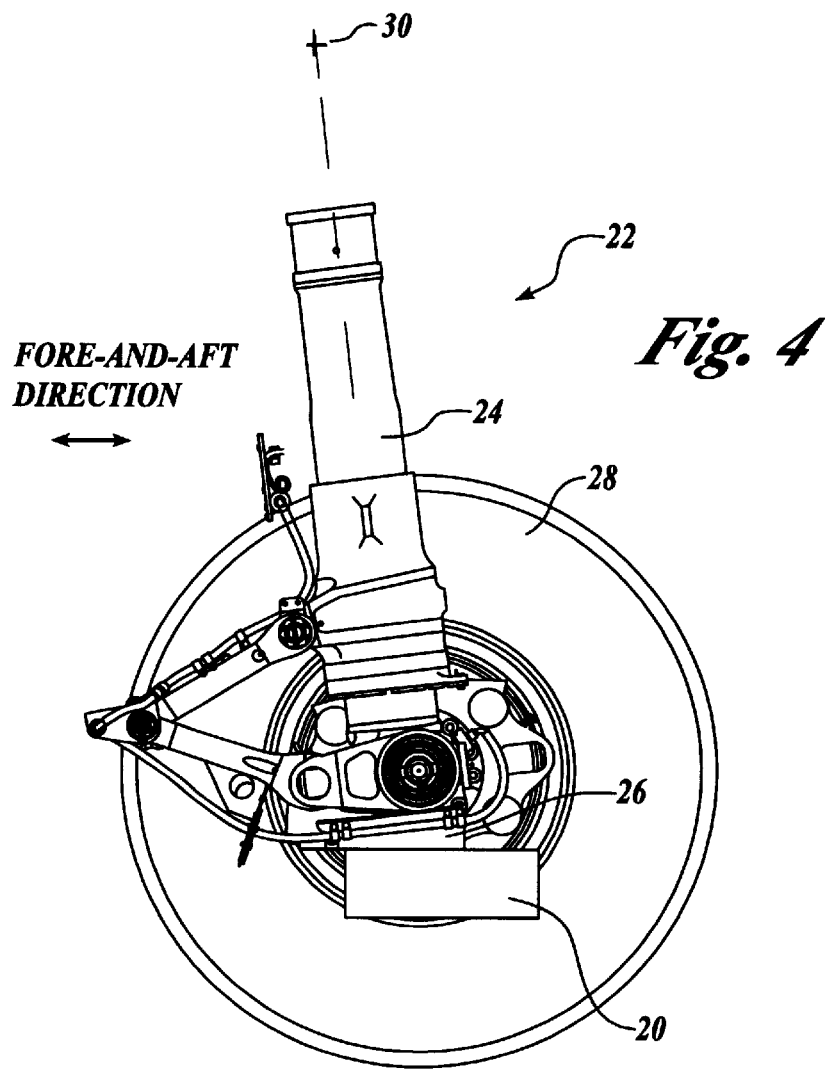
FIG. 4 is a side elevational view of an arrangement of a tuned mass absorber formed in accordance with the present invention as attached to an example aircraft landing gear member.

FIG. 4 is a side elevational view of an arrangement of a tuned mass absorber 20 as attached to an example aircraft landing gear member 22. The member includes a strut 24 with a distal end 26. A wheel 28 is rotatably attached to the strut distal end 26. Various retraction components are attached to the strut and/or wheel. During gear walk, the landing gear exhibits a slightly angular vibration about an axis 30 located above the wheel in the landing gear system or elsewhere in the aircraft. The vibration causes the wheel and the strut distal end to move in a fore-and-aft direction.

In the configuration of FIG. 4, the tuned mass absorber is a housing canister 32 bolted to the underside of the strut distal end 26. The housing canister 32 houses an internal mass 34 and a spring 36. See, for example, the tuned mass absorber shown in FIG. 5. The combination of these components is tuned to match the natural frequency of the landing gear. The tuned mass absorber 20 is attached to a landing gear member in an orientation such that during gear walk the mass 34 vibrates in a fore-and-aft direction. The tuned mass absorber 20 is preferably located as radially far away from the axis of vibratory rotation of the landing gear as possible. By locating the absorber at the farther point, the effectiveness of the absorber forces are maximized by increasing the moment it produces about the landing gear center of pitch rotation.

Figure 5:
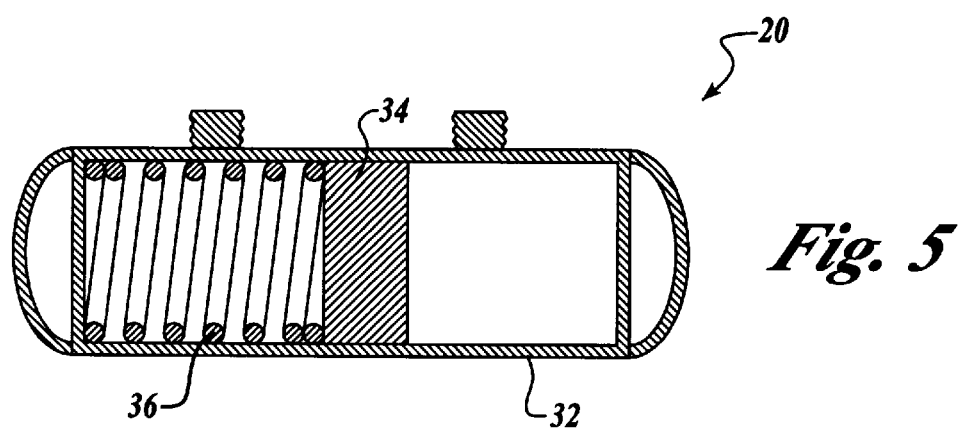
FIG. 5 a side cross-sectional view of an embodiment of a tuned mass absorber formed in accordance with the present invention.

In general, the tuned mass absorber itself may be any of a number of known types. In FIG. 5, the spring 36 is positioned at one end of the interior of the housing canister 32. The mass 34 is attached to the spring 36 so that the mass is generally located in the center of the housing canister interior. The spring 36 may be formed from any one of a number of known types, e.g., a coiled metal spring, an elastomeric material, fluid, etc.

The actual mass amount is dependent on the actual landing gear assembly to which it is being applied, and hence will vary from application to application as illustrated in the process defined by FIG. 3.

In one embodiment, a mass in the range of about 30 lbs to about 40 lbs resulted in an appreciable reduction in gear walk motion. In another embodiment, a mass of about 1% of the effective landing gear mass was sufficient. The effective landing gear mass is defined as the mass of the wheels, brakes, tires, and strut that effectively moves during gear walk motion. The effective mass could also be called a modal mass from the relation of mass and stiffness which determine natural frequency. In still another embodiment, a mass of an amount equal to or less than about 2% of the effective landing gear mass was sufficient. For small landing gear configurations, a mass of less than or equal about 1% may be acceptable.

The mass of the tuned absorber is generally of an amount that is less than or equal to about 20% of the mass predicted from the classical solution of equation (1) above. The distance $X_2$ available for the absorber will also vary from application to application. One embodiment uses a distance of less than about 4 inches. Another embodiment uses a distance of about 2 inches to about 3 inches.

As will be appreciated by those skilled in the art, the present invention method of analyzing the gear walk phenomenon is a significant departure from the traditional vibration analysis. Using this method, a relatively small mass can limit the growth of gear walk vibration early on and effectively prevent the oscillations from growing. Depending on the particular landing gear system, this relatively small mass has been shown to prevent gear walk vibrations altogether. A tuned mass absorber formed in accordance with the present invention thus avoids the need to use an absorber mass capable of producing forces large enough to counteract the gear walk peak amplitude A. Therefore, a tuned mass absorber formed in accordance with the present invention is a significant advantage in aircraft where space and weight are considerable constraints.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In an aircraft landing gear system having a braking assembly, an elongated strut, and a wheel-and-tire assembly attached to a strut distal end, during use the landing gear system exhibiting fore and aft gear walk motion about an axis of rotation located above the wheel in a lateral plane, the gear walk vibration being a divergent motion caused by self-excited brake forces, the divergent motion including a peak amplitude motion and a pre-peak amplitude motion, an improvement comprising:

a tuned mass absorber attached to the strut near its distal end, the tuned mass absorber including a mass and a spring, the tuned mass absorber being oriented to cause its mass to move in a fore-and-aft direction at a frequency and amplitude that counterbalances the gear walk pre-peak amplitude motion by using a mass of an amount less than the mass required to counterbalance the gear walk peak amplitude motion, whereby the tuned mass absorber eliminates the gear walk motion in its formation.

2. The improvement according to claim 1, wherein the tuned mass absorber includes a mass of an amount in the range of about 1% to about 2% of the effective landing gear mass.

3. The improvement according to claim 1, wherein the tuned mass absorber comprises a housing canister having first and second interior regions and a middle interior region, a metal coil spring housed in the first interior region, and a mass housed in the middle interior region and engaged with the spring.

4. The improvement according to claim 1, wherein the tuned mass absorber comprises a housing canister, an elastomeric material, and a mass; the elastomeric material and mass being fitted into the housing canister.

5. The improvement according to claim 1, wherein the mass is of an amount less than or equal to about 20% of the mass $M_2$ predicted from the equation $F=(-\omega^2) \times M_2 \times X_2$, where F is the peak force during the gear walk motion, $\omega$ is the natural frequency of the landing gear, and $X_2$ is the allowable range of motion for mass $M_2$.

6. A method of eliminating aircraft landing gear fore-and-aft vibration having a peak amplitude motion and a pre-peak amplitude motion, the method comprising using a tuned mass absorber attached to the landing gear, the tuned mass absorber including a mass and a spring, the tuned mass absorber being oriented to cause its mass to move in a fore-and-aft direction at a frequency and amplitude that counterbalances the gear fore-and-aft vibration, the mass being of an amount addressed to the pre-peak amplitude motion.

7. The method according to claim 6, wherein the mass is of an amount less than or equal to about 2% of the effective landing gear mass.

8. The method according to claim 6, wherein the mass is of an amount in the range of about 1% to about 2% of the effective landing gear mass.

9. The method according to claim 6, wherein the tuned mass absorber comprises a housing canister having first and second interior regions and a middle interior region; and wherein the spring is a metal coil spring housed in the first interior region, and the mass is housed in the middle interior region and engaged with the metal coil spring.

10. The method according to claim 6, wherein the tuned mass absorber comprises a housing canister; and wherein the spring is an elastomeric material, and the elastomeric material and the mass are fitted into the housing canister.

11. The method according to claim 6, wherein the mass is of an amount less than or equal to about 20% of the mass $M_2$ predicted from the equation $F=(-\omega^2) \times M_2 \times X_2$, where F is the peak force during the gear walk motion, $\omega$ is the natural frequency of the landing gear, and $X_2$ is the allowable range of motion for mass $M_2$.

* * * * *